(12) United States Patent
Oh et al.

(10) Patent No.: US 10,211,447 B2
(45) Date of Patent: Feb. 19, 2019

(54) BATTERY INCLUDING GAS DISCHARGING MEMBER AND ELECTROLYTE INJECTION MEMBER

(71) Applicant: LG Chem, Ltd., Seoul (KR)

(72) Inventors: Sei Woon Oh, Daejeon (KR); Seok Koo Kim, Daejeon (KR); Eun Ju Lee, Daejeon (KR); Bokkyu Choi, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 416 days.

(21) Appl. No.: 14/787,689

(22) PCT Filed: Jul. 9, 2014

(86) PCT No.: PCT/KR2014/006155
§ 371 (c)(1),
(2) Date: Oct. 28, 2015

(87) PCT Pub. No.: WO2015/016497
PCT Pub. Date: Feb. 5, 2015

(65) Prior Publication Data
US 2016/0133914 A1 May 12, 2016

(30) Foreign Application Priority Data
Jul. 29, 2013 (KR) .................. 10-2013-0089872

(51) Int. Cl.
H01M 2/38 (2006.01)
H01M 2/12 (2006.01)
(Continued)

(52) U.S. Cl.
CPC ............ H01M 2/38 (2013.01); H01M 2/021 (2013.01); H01M 2/12 (2013.01); H01M 2/1264 (2013.01);
(Continued)

(58) Field of Classification Search
CPC .......... H01M 2/38; H01M 2/021; H01M 2/12; H01M 2/1264; H01M 2/36
See application file for complete search history.

(56) References Cited

U.S. PATENT DOCUMENTS

2005/0244705 A1 11/2005 Cherng et al.
2010/0024204 A1 2/2010 Min et al.
(Continued)

FOREIGN PATENT DOCUMENTS

CN 101512821 A 8/2009
JP S61284062 A 12/1986
(Continued)

OTHER PUBLICATIONS

Search Report from Office Action from Chinese Application No. 201480024214.0, dated Nov. 30, 2016.
(Continued)

Primary Examiner — Ula C Ruddock
Assistant Examiner — Frank A Chernow
(74) Attorney, Agent, or Firm — Lerner, David, Littenberg, Krumholz & Mentlik, LLP

(57) ABSTRACT

Disclosed herein is a battery including a cell having an electrode laminate and a liquid electrolyte mounted in an internal space of a battery case, a gas discharging member communicating with the internal space of the battery case for discharging gas generated in the cell out of the cell, and a liquid electrolyte injection member communicating with the internal space of the battery case for injecting a liquid electrolyte into internal space of the battery case.

13 Claims, 1 Drawing Sheet

(51) Int. Cl.
  *H01M 2/02*    (2006.01)
  *H01M 2/36*    (2006.01)
  *H01M 10/04*   (2006.01)
  *H01M 10/0525* (2010.01)
  *H01M 10/05*   (2010.01)

(52) U.S. Cl.
  CPC ............. *H01M 2/36* (2013.01); *H01M 10/04* (2013.01); *H01M 10/05* (2013.01); *H01M 10/0525* (2013.01); *H01M 2220/30* (2013.01)

(56) References Cited

U.S. PATENT DOCUMENTS

| | | | |
|---|---|---|---|
| 2010/0239895 | A1 | 9/2010 | Yang et al. |
| 2011/0300437 | A1 | 12/2011 | Yi |
| 2012/0176730 | A1* | 7/2012 | Takemura ............... H01G 11/20 361/518 |
| 2012/0196161 | A1 | 8/2012 | Yang et al. |

FOREIGN PATENT DOCUMENTS

| | | | |
|---|---|---|---|
| JP | 06-176748 A | 6/1994 |
| JP | H10235246 A | 9/1998 |
| JP | 2003123719 A | 4/2003 |
| JP | 2003235246 A | 8/2003 |
| JP | 2004281061 A | 10/2004 |
| JP | 2005339946 A | 12/2005 |
| JP | 2010503150 A | 1/2010 |
| JP | 2010-062163 A | 3/2010 |
| JP | 2010055990 A | 3/2010 |
| JP | 2011-171159 A | 9/2011 |
| JP | 2011171013 A | 9/2011 |
| JP | 2011253797 A | 12/2011 |
| KR | 2008-0042966 A | 5/2008 |
| KR | 2012-0032645 A | 4/2012 |
| KR | 20120062232 A | 6/2012 |
| WO | 2012-044005 A2 | 4/2012 |

OTHER PUBLICATIONS

International Search Report for Application No. PCT/KR2014/006155 dated Nov. 12, 2014.
Extended European Search Report for Application No. EP14832945.1 dated Aug. 22, 2016.

* cited by examiner

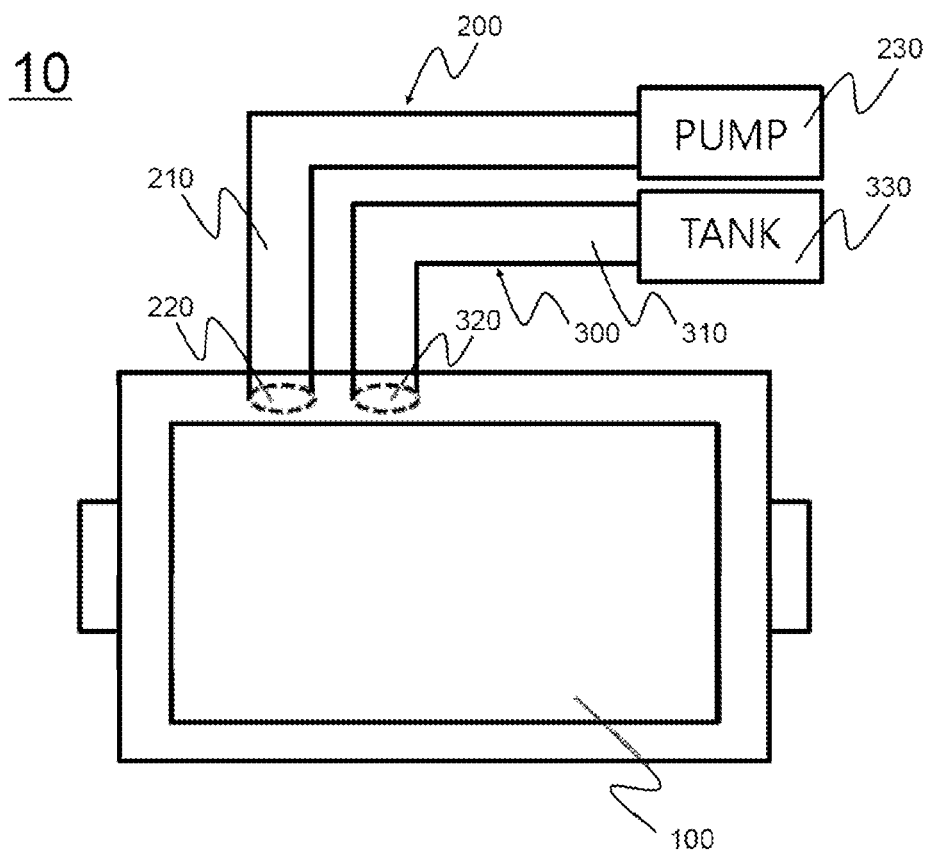

BATTERY INCLUDING GAS DISCHARGING MEMBER AND ELECTROLYTE INJECTION MEMBER

CROSS-REFERENCE TO RELATED APPLICATION

The present application is a national phase entry under 35 U.S.C. § 371 of International Application No. PCT/KR2014/006155, filed Jul. 9, 2014, which claims priority from 10-2013-0089872 filed Jul. 29, 2013, all of which are incorporated herein by reference.

TECHNICAL FIELD

The present invention relates to a battery including a gas discharging member and an electrolyte injection member.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having a high energy density and discharge voltage, into which much research has been carried out and which is now commercialized and widely used.

In general, a secondary battery is configured to have a structure in which an electrode assembly including a positive electrode and a negative electrode stacked or wound in a state in which a separator is disposed between the positive electrode and the negative electrode is mounted in a battery case made of a metal can or a laminate sheet, and an electrolyte is injected into the battery case or the electrode assembly is impregnated with the electrolyte.

The electrolyte in the secondary battery is decomposed during repeated charge and discharge of the secondary battery. As a result, gas is generated from the secondary battery. Particularly for a pouch-shaped secondary battery, a battery cell mounted in the secondary battery is sealed in a vacuum state so as to minimize contact between the battery cell and external air. For this reason, it is substantially impossible to discharge the generated gas out of the battery cell and to further inject an electrolyte into the battery cell.

Therefore, there is a high necessity for a novel lithium secondary battery that is capable of solving the above problems.

DISCLOSURE

Technical Problem

The present invention has been made to solve the above problems and other technical problems that have yet to be resolved.

It is an object of the present invention to provide a battery into which an electrolyte can be further injected and from which gas generated in the battery can be discharged.

Technical Solution

In accordance with one aspect of the present invention, the above and other objects can be accomplished by the provision of a battery including a cell having an electrode laminate and a liquid electrolyte mounted in an internal space of a battery case, a gas discharging member communicating with the internal space of the battery case for discharging gas generated in the cell out of the cell, and a liquid electrolyte injection member communicating with the internal space of the battery case for injecting a liquid electrolyte into internal space of the battery case.

As described above, the battery according to the present invention includes the gas discharging member and the liquid electrolyte injection member. Consequently, it is possible to further inject a liquid electrolyte into the battery and to easily discharge gas generated in the battery out of the battery.

The gas discharging member may include a pipe member communicating with the internal space of the battery case and a liquid material non-transmissive porous film mounted at one end of the pipe member.

The porous film may have a pore size of 0.1 nm to 1 nm. If the pore size of the porous film is less than 0.1 nm, gas may not be smoothly discharged. On the other hand, if the pore size of the porous film is more than 1 nm, the liquid electrolyte may be transmitted through the porous film. For this reason, the porous film may have the above-defined pore size range.

The gas discharging member may further include a suction member mounted at the other end of the pipe member.

Specifically, the suction member may be a suction pump.

The liquid electrolyte injection member may include a pipe member communicating with the internal space of the battery case and a liquid electrolyte storage tank mounted at one end of the pipe member.

The liquid electrolyte injection member may further include a backward flow prevention member mounted at the other end of the pipe member.

Specifically, the backward flow prevention member may be a check valve.

The check valve may include a center pin, a first membrane fixedly coupled to the pipe member, the first membrane being provided with a hollow portion, through which the center pin extends, and a through hole, through which the liquid electrolyte is injected, a second membrane coupled to one end of the center pin, the second membrane being coupled to or separated from the first membrane for opening and closing the pipe member, and an elastic member for maintaining a coupling state between the first membrane and the second membrane.

The elastic member may be a compression spring.

The cell may be a pouch-shaped cell comprising a space portion having an electrode laminate and an electrolyte mounted therein and a sealed portion surrounding the space portion, the sealed portion being provided with through holes coupled to the pipe member of the liquid electrolyte injection member and the pipe member of the gas discharging member.

A backward flow prevention member may be further mounted at one end of each of the through holes.

In accordance with another aspect of the present invention, there is provided a battery module including the battery with the above-stated construction as a unit battery.

In accordance with another aspect of the present invention, there is provided a battery pack including the battery module as a unit module.

In accordance with a further aspect of the present invention, there is provided a device including the battery pack as a power source. Specifically, the device may be any one selected from a group consisting of a mobile phone, a portable computer, a smart phone, a smart pad, a netbook computer, a light electronic vehicle (LEV), an electric vehicle, a hybrid electric vehicle, a plug-in hybrid electric vehicle, and a power storage device.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a battery according to an embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a typical view showing a battery according to an embodiment of the present invention.

Referring to FIG. 1, a battery 10 includes a cell 100, a gas discharging member 200, and a liquid electrolyte injection member 300.

The gas discharging member 200 includes a pipe member 210, a liquid material non-transmissive porous film 220, and a suction pump 230.

Gas generated in the cell 100 is discharged out of the cell 100 via the pipe member 210 according to the operation of the suction pump 230 of the gas discharging member 200. The porous film 220 prevents a liquid electrolyte from being discharged out of the cell 100 via the pipe member 210 during the above-described process.

The liquid electrolyte injection member 300 includes a pipe member 310, a check valve 320, and a liquid electrolyte storage tank 330.

After the gas is discharged out of the battery 10, a liquid electrolyte stored in the liquid electrolyte storage tank 330 of the liquid electrolyte injection member 300 is injected into the cell 100 via the pipe member 310. The check valve 320 prevents the liquid electrolyte from flowing backward from the cell 100 to the liquid electrolyte storage tank 330.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery according to the present invention includes a gas discharging member and a liquid electrolyte injection member. Consequently, it is possible to further inject a liquid electrolyte into the battery and to easily discharge gas generated in the battery out of the battery.

The invention claimed is:

1. A battery comprising:
a battery case having a first internal space;
a cell mounted in the internal space, the cell having an electrode laminate and a liquid electrolyte;
a first pipe member communicating with the internal space of the battery case for discharging gas generated by the cell from the first internal space, where the first pipe member having a second internal space and having an inlet and an outlet, the inlet facing the first internal space and the outlet at the opposite end of the first pipe member from the inlet;
a liquid material non-transmissive porous film, the porous film having a first side directly contacting the first internal space and a second side opposite the first side, wherein the second side directly contacts the second internal space of the first pipe member, wherein pores of the porous film extend between the first side and the second side;
a suction member mounted at the outlet; and
a liquid electrolyte injection member communicating with the first internal space of the battery case for injecting a liquid electrolyte into first internal space of the battery case.

2. The battery according to claim 1, wherein the porous film has a pore size of 0.1 nm to 1 nm.

3. The battery according to claim 1, wherein the suction member is a suction pump.

4. The battery according to claim 1, wherein the liquid electrolyte injection member comprises a second pipe member communicating with the first internal space of the battery case and a liquid electrolyte storage tank mounted at one end of the pipe member.

5. The battery according to claim 4, wherein the liquid electrolyte injection member further comprises a backward flow prevention member mounted at the other end of the second pipe member.

6. The battery according to claim 5, wherein the backward flow prevention member is a check valve.

7. The battery according to claim 6, wherein the check valve comprises:
a center pin;
a first membrane fixedly coupled to the pipe member, the first membrane being provided with a hollow portion, through which the center pin extends, and a through hole, through which the liquid electrolyte is injected;
a second membrane coupled to one end of the center pin, the second membrane being coupled to or separated from the first membrane for opening and closing the second pipe member; and
an elastic member for maintaining a coupling state between the first membrane and the second membrane.

8. The battery according to claim 7, wherein the elastic member is a compression spring.

9. The battery according to claim 1, wherein the cell is a pouch-shaped cell comprising a space portion having an electrode laminate and an electrolyte mounted therein and a sealed portion surrounding the space portion, the sealed portion being provided with through holes coupled to a second pipe member of the liquid electrolyte injection member and the first pipe member.

10. The battery according to claim 9, further comprising a backward flow prevention member mounted at one end of each of the through holes.

11. A battery module comprising a battery according to claim 1.

12. A battery pack comprising a battery module according to claim 11.

13. A device using a battery pack according to claim 12 as a power source.

* * * * *